Aug. 27, 1929.　　　R. L. CORBY　　　1,725,781
BREAD TESTING APPARATUS
Filed March 12, 1925　　　2 Sheets-Sheet 1

INVENTOR
Robert L. Corby
BY
Mayer, Warfield & Keralson
ATTORNEYS

Patented Aug. 27, 1929.

1,725,781

UNITED STATES PATENT OFFICE.

ROBERT L. CORBY, OF NEW YORK, N. Y.

BREAD-TESTING APPARATUS.

Application filed March 12, 1925. Serial No. 14,876.

This invention relates to apparatus for cutting loaves of bread and the like, and more particularly to apparatus for cutting loaves in a manner adapted to facilitate the determination of the characteristics of bread dough and of loaves baked therefrom by the methods such, for example, as set forth in my copending application, Serial No. 84,646, filed January 29, 1926, which is a division hereof.

An object of the invention is to provide improved apparatus for readily and accurately dividing a loaf of bread or the like.

Another object of the invention is to provide apparatus which is adapted for use in methods for quickly and accurately making tests on bread and determining the characteristics of the dough, and which is efficient, economical and readily manufactured.

Another object is to provide a cutting device which is arranged to divide loaves of bread along longitudinal planes approximately parallel to their bottom surfaces, so that observations may be made which facilitate volume determinations.

Other objects of the invention will in part be obvious and will in part appear hereinafter.

The invention accordingly comprises the apparatus embodying features of construction, combinations of elements and arrangement of parts, all as exemplified in the following detailed disclosure, and the scope of the application of which will be indicated in the claims.

For a fuller understanding of the nature and objects of the invention reference should be had to the following detailed description taken in connection with the accompanying drawing, in which.

Figure 1:
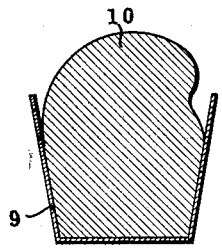
Fig. 1 is a section through a baking pan containing a loaf of bread.
Figure 2:
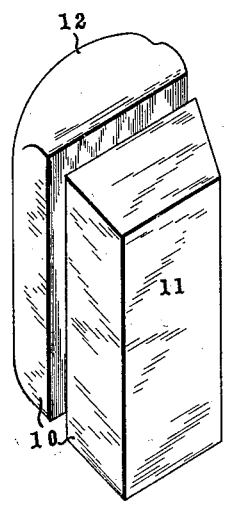
Fig. 2 is a perspective view showing a loaf divided along a longitudinal plane.
Figure 3:
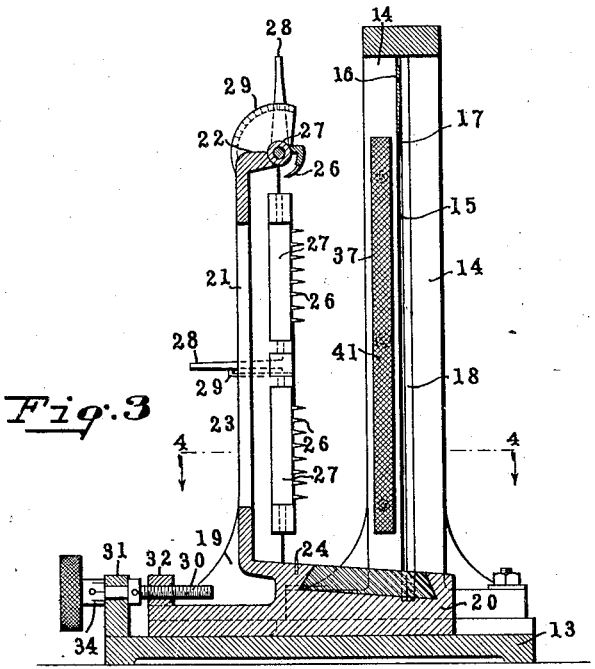
Fig. 3 is a vertical section of the cutting device.

Heretofore, when testing bread, the usual method of determining the volume of the loaf was to measure the quantity of a material such as flax seed displaced by the loaf. The results secured by this method, however, are merely roughly approximate, and to some extent are misleading, so that computations based thereon, such as for example a computation whereby the density of a loaf of bread is ascertained, are unreliable. Furthermore, this method gives no information as to the path of expansion of the dough as indicated by the shape of the baked loaf.

My improved method comprises dividing a loaf of bread or the like along a plane extending adjacent to or through that portion of the loaf which conforms to the shape of the baking pan so as to produce one portion of regular contour, the dimensions of which can be readily ascertained, and another portion of irregular contour. When it is desired to determine the expansion characteristics of a mass of dough, this plane will preferably extend parallel to the bottom surface of the loaf and through the innermost point thereon where the surface of the loaf left the baking pan; but in case it is desired to determine only the volume and density of the whole loaf, the loaf may be cut along any plane which extends through the portion thereof having a surface of regular contour.

In practice a loaf 10 which has been baked in a pan 9 is cut along a plane parallel to its bottom surface so as to divide the loaf into a lower or inner portion 11 and an upper or outer portion 12. The dimensions of the baking pan being known, it is only necessary to ascertain the depth of the inner portion 11 of the loaf in order that the volume of this portion may be determined, which volume will indicate the extent to which the mass of dough has expanded outwardly against the walls of the baking pan. Moreover, after the volume of this portion has been ascertained, the portion may be weighed and the density thereof computed. Inasmuch as the density of a loaf of bread baked under the proper conditions is substantially the same at all portions thereof it can safely be assumed that the outer portion 12 of the loaf has the same density as the inner portion 11. After the outer portion 12 is weighed, the volume of this portion may therefore be computed by multiplying the density factor obtained in connection with the portion 11 by the weight of the portion 12. Thereafter all that is necessary to obtain an exceedingly accurate cubical measurement of the loaf is to add the volumes of the portions of the loaf obtained in the manner set forth above.

One type of apparatus is here shown whereby an accurate division of a loaf of bread may be obtained and whereby certain of the calculations outlined above may be performed. This apparatus includes a frame 13 comprising a pair of uprights 14 on either side of the base thereof. Each of these uprights is formed with a transverse slot 15 extending substantially throughout the length of the upright. The slots 15 are aligned and are adapted to have a knife 16 inserted therethrough and moved downwardly therealong in a vertical path. This knife should preferably be as thin as practicable and bevelled on one side only as indicated at 17. In order that lateral movement of the knife may be prevented, the width of the slots should not be substantially greater than the thickness of the knife; the slots in the present instance being partially filled with strips 18 whereby their width is reduced.

Figure 4:
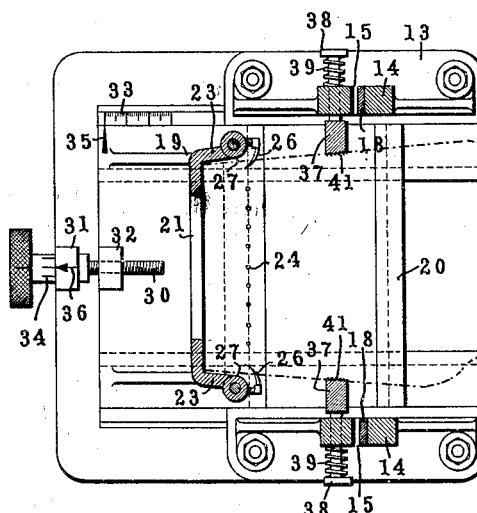
Fig. 4 is a section of the device along the line 4—4 in the direction of the arrows indicated in Fig. 3.
Figure 5:
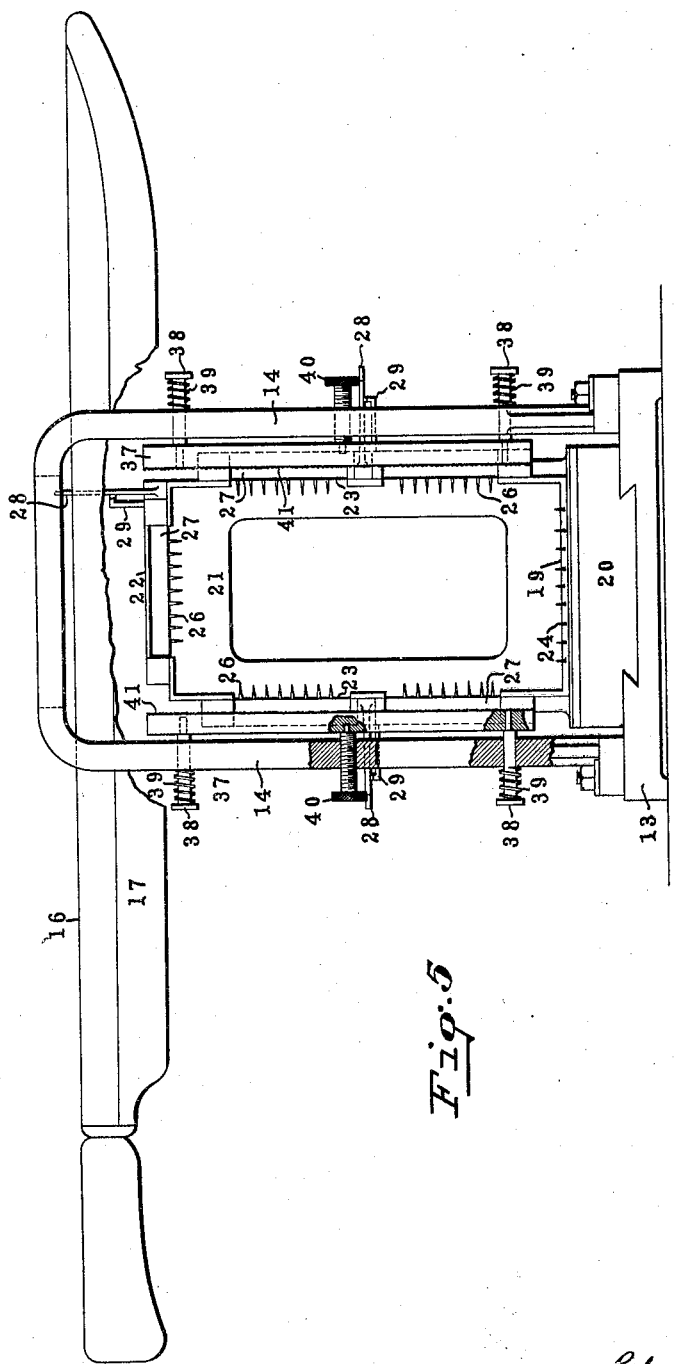
Fig. 5 is a partly sectional end view thereof.

With a view to holding a loaf of bread in such position that a knife extending through the slots 15 and guided in a vertical path by the uprights 14 may cut the loaf longitudinally, there is provided in the present instance a holder 19 which is slidably mounted with respect to the frame 13. The holder comprises a base 20, a back 21, a top 22 and sides 23, the inner surfaces of which members correspond in contour to the inner surfaces of the baking pan so that the inner portion of a loaf of bread will fit therein in an upright position, as indicated by the dotted lines in Fig. 4, with the flat or bottom surface of the loaf parallel to the path of travel of the knife 16.

For the purpose of firmly securing the loaf in such position on the holder, there is provided in the present construction a row of spikes 24 projecting upwardly from the base 20, and there are also provided a plurality of rows of spikes 26 supported on the top 22 and each of the sides 23 in such manner as they may be moved into the sides of a loaf positioned against the back 21 of the holder. To this end the rows of spikes 26 are mounted upon cylinders 27 carried by the top and sides of the holder and adapted to be rotated by means of levers 28, which bear against notched guides 29.

In order that the holder 19 may be moved with respect to the frame 13 so as to adjust the relative position of the loaf to the path of travel of the knife 16, there is provided a screw 30 rotatably mounted on an extension 31 on the frame 13 and threaded into an extension 32 on the holder 19. Now with a view to determining the extent of movement of the holder with respect to the frame and to determining the exact relative positions of the back 21 and the slots 15, there is provided on one side of the frame 13, adjacent the holder 19, a scale 33 which is preferably calibrated so that the distance between successive indications will be the distance which the holder 19 is moved by a single turn of screw 30 and there is provided on the screw 30 a series of calibrations 34 indicating fractions of a turn, and there is also provided on the holder 19 adjacent the scale 33 and on the extension 32 adjacent the calibrations 34, respectively, suitable indicating marks 35 and 36.

The scale 33 is preferably tabulated in such a manner that there may be read directly therefrom the distance between the slots 15 and the back 21 of the holder, or, in other words, the depth of the inner portion 11 of the loaf 10. Obviously, if the device is to be employed in connection with loaves baked in pans of uniform shape and dimensions, the scale may be calibrated to indicate directly the volume of the inner portion of the loaf.

In order that the sides of the loaf may be securely held against the lateral movement as the knife is sawed through the same, there is provided inside each of the uprights 14 a vertically extending clamp 37 which is secured to its respective upright by means of a pair of pins 38 which are slidably mounted on the upright. The clamps are normally held adjacent the uprights so as to be out of the path of movement of the loaf 10 by means of coiled springs 39, but are movable inwardly against the sides of the loaf by means of screws 40 threaded into the uprights and bearing against the clamps. The inner surfaces of the clamps 37 are preferably knurled as indicated at 41 so as securely to grip the sides of the loaf without defacing the same.

The operation of the apparatus exemplified is as follows: A loaf of bread which has been baked in a pan such as indicated at 9 is placed on the holder 19 with the bottom surface thereof against the back 21 of the holder and one end of the loaf is pressed downwardly upon the upwardly extending spikes 24. The levers 28 are then moved so as to rotate the cylinders 27 to thrust the spikes 26 into the side and top surfaces of the loaf. The holder 19 is then moved along the frame 13 by means of the screw 30 until the plane through which the edge of the knife moves, bisects the loaf at the desired point. The screws 40 are then turned to move the clamps 37 against the surfaces of the loaf and the knife 16 is inserted through the upper portions of the slots 15, pressed against the upper surface of the loaf, and moved downwardly through the same with the usual sawing motion so as to cut the loaf portions 11 and 12 from which the desired determinations can be made in accordance with the invention.

The process and apparatus disclosed herein are particularly applicable for use in conjunction with loaves of bread baked in the special type of bread pan disclosed in my copending application filed on the 12th day of March, 1925, Serial No. 14,875.

Since certain changes in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Bread-testing apparatus including, in combination, means to cut from a loaf of bread baked in a pan of predetermined dimensions a portion thereof conforming with the contour of said pan, and a calibrated scale associated with said cutting means, the calibration on said scale being arranged to indicate directly the volume of said portion of said loaf.

2. In a loaf-cutting device, in combination, a frame, members extending upwardly on either side of said frame and formed with aligned slots for guiding a knife along a predetermined path, a loaf-supporting holder carried by said frame and arranged to carry a supported loaf across said path, loaf-gripping devices forming a part of said holder, and arranged to secure a loaf firmly thereon, and a clamping member carried on each of said slotted members and arranged for inward movement, and means to move said clamps against a loaf carried on said holder.

3. In a loaf-cutting device, in combination, a frame, means carried by said frame adapted to guide a knife along a predetermined path, a loaf supporting holder carried by said frame and arranged to carry a supported loaf across said path, a portion of said holder being shaped approximately to conform with the divergent sides of said loaf, and having gripping means pivoted at the extremities thereof, and a screw mounted on said frame and threaded through a portion of said holder whereby the relative positions of said frame and said holder may be adjusted to any desired degree by a steady and continuous movement.

4. In a loaf-cutting device, in combination, a frame, a pair of uprights mounted on each side of said frame and providing therebetween a slot for guiding a knife, a holder carried by said frame and arranged for movement between said pairs of uprights, a screw mounted on said frame and threaded through a portion of said holder to permit a gradual and uniform adjustment of the relative positions of said holder and said frame upon the rotation of said screw, a loaf-gripping device forming a part of said holder and arranged to grip the side and ends of a rectangular loaf to secure the same on said holder in a vertical position, and a vertically-extended clamping member carried on one of each pair of uprights and arranged for movement toward said loaf, and screw means to press said clamps against a loaf held on said holder.

5. In a device for cutting loaves of bread and the like, in combination, a frame, means carried by said frame and adapted to guide the knife along a predetermined path, loaf-supporting means movable with respect to said frame for holding a loaf in any of a plurality of positions to be cut by a knife moving along said path whereby the loaf may be separated into portions having different characteristics, means carried by said supporting means to grip the sides of a supported loaf, and a plurality of clamps carried by said frame and movable against the sides of said loaf.

In testimony whereof I affix my signature.

ROBERT L. CORBY.